United States Patent Office 3,684,551
Patented Aug. 15, 1972

3,684,551
METHOD OF PRODUCING PRESSURE SENSITIVE COPYING SHEETS
Jerome A. Seiner, 5415 Plainfield St., Pittsburgh, Pa. 15217
Filed Apr. 15, 1970, Ser. No. 28,727
Int. Cl. B41m 5/16
U.S. Cl. 117—36.7  6 Claims

ABSTRACT OF THE DISCLOSURE

Disclosed herein are various films containing minute droplets of an entrapped and preferably volatilizable liquid which is a non-solvent for the polymeric material of the film matrix. Upon the application of pressure, as by a typewriter key, to the film, the cells of the film which contain the droplets of liquid non-solvent are ruptured in the area of pressure. This rupturing enables the liquid non-solvent to escape, and renders the films opaque in the area of rupture and release of non-solvent. Such films are useful, for example, as coatings on typewriter or other printing paper.

BACKGROUND OF THE INVENTION

Various techniques for rendering polymeric films opaque have been developed in the past. Each of these techniques seeks to optimize optical opacity in its own way. For example, opaque films are most conventionally prepared by adding a pigment which acts as an opacifying agent to a solution of a film forming material which would otherwise be colorless or transparent when cast in a film. As will be more fully explained hereinafter, the amount and size of the pigment particles generally are felt to be the criteria for optimum opacity.

Various other techniques have been developed in the art for preparing opaque films which rely for opacity upon the presence of a large number of voids in the films. Such films may be prepared, for example, by depositing a film from an emulsion, e.g., either an oil-in-water or a water-in-oil emulsion. When a water-in-oil emulsion is used— i.e., one in which minute droplets of water are dispersed in a continuous phase of a film forming material—the emulsion is deposited as a coating and the organic solvent which comprises the continuous phase of the emulsion is evaporated therefrom. This causes gelation of the film forming material and entrapment of the dispersed water droplets. The water is then evaporated leaving microscopic voids throughout the film structure.

When the oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is formed into a thin layer and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. A film is then formed from this aqueous dispersion and water is evaporated causing entrapment of minute droplets of the organic solvent in the polymer. The film obtained is then washed to dissolve the entrapped minute droplets of solvent and the film is dried.

Still another technique for obtaining porous, opaque, non-pigmented films is set forth in U.S. Pat. No. 2,961,-334. Basically, this process contemplates adding a polymeric material to a liquid solvent to thereby form either a solution or a quasi-solution (i.e., as by peptizing). To this continuous phase is added a liquid which has a higher boiling point than the liquid solvent and which is a non-solvent for the film forming polymeric materials. The resulting emulsion is then applied to a substrate whereupon an opaque film is formed after first evaporating the water and then the non-solvent.

Although the above techniques have proved useful in producing opaque films, it was not until recently that good, economically feasible, polymeric films having optimum opacity became obtainable. One recently developed technique for obtaining these improved films is disclosed in applicant's copending application Ser. No. 4,175, filed Jan. 14, 1970, now abandoned which is a continuation application of Ser. No. 524,953, filed Feb. 1, 1966 now abandoned. In this application optimum opacity is achieved by a process which generally comprises: (a) applying to a substrate a composition comprising a film forming gelable polymer, and a solvent mixture for said film forming material comprising at least two miscible liquids, at least one of said liquids being a non-solvent for said polymer and having a lower volatility than that of the other liquids in said mixture, and the amount of said lower volatility non-solvent liquid present in said mixture being at least enough to product, upon the removal of said solvent mixture from said composition, a film having a Kubelka-Munk scattering coefficient greater than 0.5 reciprocal mil at 4400 angstroms and greater than 0.1 reciprocal mil at 5600 angstroms and (b) removing the solvent mixture from the composition applied to said substrate.

Another technique which has proved extremely useful for obtaining improved films is disclosed in applicant's copending applications Ser. No. 741,502, filed July 1, 1968 and Ser. No. 745,433, filed July 17, 1968. The technique disclosed in these applications basically includes the steps of applying to a substrate a mixture comprising a latex and a liquid which has a higher boiling point than water and which is a non-solvent for the polymeric material of the latex, removing the water and other continuous phase components which may be added such as glycol from the applied mixture. During this removal, a sufficient amount of non-solvent is entrapped in the polymeric material before it becomes tack-free so that upon further evaporation, a resulting white and opaque film is produced which will have an optimum Kubelka-Munk scattering coefficient as described above due to a plurality of minute closed cells. In this method, the entrapment of the non-solvent may be controlled by several procedures depending upon the type polymeric latex system chosen.

Optical opacity, for example, the hiding power of a paint film, is achieved either by absorption of the incident light or by scattering of the incident light, or a combination of these two. Thus, black is opaque because it absorbs the light incident on it and white is opaque because it back scatters the incident light. Light is either absorbed scattering coefficient. No amount is taken of the surface pigment then is one which has zero absorption and maximum scattering.

Absorption depends primarily on the electronic structure of the molecule, as well as on the pigment particle size relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1-R\infty)^2}{2R\infty} = \frac{K}{S} \qquad \text{(Equation 1)}$$

wherein $R\infty$ is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R)^2}{2R} = \frac{C_1 K_1 + C_2 K_2 + C_3 K_3 \ldots}{C_1 S_1 + C_2 S_2 + C_3 S_3 \ldots}$$

(Equation 2)

wherein $C_1$, $C_2$ and $C_3$ refer to the concentrations of pigments 1, 2, 3, etc.

When hiding is incomplete, the following equation applies:

$$R = \frac{1 - Rg(a - b \text{ ctgh } bSX)}{a - Rg + b \text{ ctgh } bSX}$$

(Equation 3)

where R is the resulting internal reflectance, $Rg$ is the reflectance of the substrate, $a$ is equal to $(S+K)/S$, $b = (a^2 - 1)^{1/2}$, S is the scattering coefficient, X is the thickness of the film in mils, and ctgh refers to hyperbolic cotangent.

The Kubelka-Munk scattering coefficient may be computed from the following equation:

$$SX = \frac{1}{b} Ar \text{ ctgh } \frac{1 - aRo}{bRo}$$

(Equation 4)

where $Ar$ ctgh refers to the inverse hyperbolic cotangent, $Ro$ is the reflectance over a black substrate of 0% reflectance, $a$ may be found from the relation, $$a = \frac{1}{2}\left[R + \frac{Ro - R + Rg}{RoRg}\right]$$

and $b$ is determined as above. In this equation, R equals reflectance over a white substrate and $Rg$ is reflectance of the substrate which is coated; or $a$ may be found from the following equation.

$$a = \frac{1}{2}\left[\frac{1}{R\infty} + R\infty\right]$$

K may be found from the equation $K = S(a-1)$.

The Kubelka-Munk analysis is discussed in further detail by D. B. Judd in "Color in Business, Science and Industry," John Wiley and Sons, New York, 1952, pp. 314–338; and by D. B. Judd and G. Wyszecki in "Color in Business, Science and Industry," 2nd edition, John Wiley and Sons, New York, 1963, pp. 387–413, the disclosures of which are incorporated herein by reference.

As alluded to in the disclosures of the above-cited copending applications, a film is generally considered to have useful opacity when it exhibits a Kubelka-Munk scattering coefficient greater than 0.5 reciprocal mil at 4400 angstroms and greater than 0.1 reciprocal mil at 5600 angstroms.

In summarizing the above-described processes for forming opaque films, it may be stated that those processes which contemplate the formation of closed cells in a film generally use the opacifying technique of evaporation to remove the discontinuous phase liquid from the film to thereby prevent rupture of the cells and maintain their closed integrity while at the same time rendering the film opaque. Preferably, the discontinuous phase liquid used is one which will permeate readily through the polymer matrix of the film so that evaporation may be achieved easily and economically. In many processes which envision the eventual formation of open cells or voids, a washing step must be used to wash-out or extract the discontinuous phase liquid from a film and thereby opacify it.

SUMMARY OF THE INVENTION

It is an object of this invention to entrap liquid in a film generally as described in the above processes in such a way to be able to use the films at some future date as opaque, design-reproducing, pressure sensitive films.

It is another object of this invention to provide films which may be used in various ways for their unique ability to turn opaque in response to applied pressure.

These and other objects are generally accomplished by providing a polymeric film containing a plurality of discrete closed cells having entrapped therein a material, preferably volatilizable, and which is a non-solvent for the polymer of the polymeric matrix of the film. Opaque films, or opaque designs within a portion of the films, are then provided by rupturing the discrete closed cells, e.g. by the application of pressure, to thereby release entrapped non-solvent. As is evident, the cells which have been emptied by releasing the non-solvent therefrom cause the resulting films to be optically white and opaque in the area of rupture or applied pressure.

This invention also provides various methods for making opacified films which basically comprise forming intermediate films according to one of the above described techniques and/or prior art techniques in adapted form which entrap a non-solvent liquid within discrete closed cells and then rupturing the cells, or a specified portion thereof, to obtain opacity.

In one embodiment of this invention, the non-solvent liquid is chosen such that it will not permeate, as by evaporation, through the polymer matrix of the entrapping film. This allows, among other things, for the curing of the polymer film without loss of liquid non-solvent from the closed cells. Such an embodiment, as well as all the films of this invention, find special utility as coatings for paper. More specifically, by coating certain types of these films which are transparent or translucent onto paper having a color other than white, or onto white paper but including in the entrapped non-solvent a coloring liquid, such a coated paper may be used either as an original or a copy sheet in a manifold set.

For purposes of commercial utility, especially when using the films as design reproducing films, this invention sets forth various methods for making films, portions of which are opaque and have a Kubelka-Munk scattering coefficient greater than 0.5 reciprocal mil at 4400 angstroms and greater than 0.1 reciprocal mil at 5600 angstroms.

DETAILED DESCRIPTION OF THE INVENTION

Figure 1:
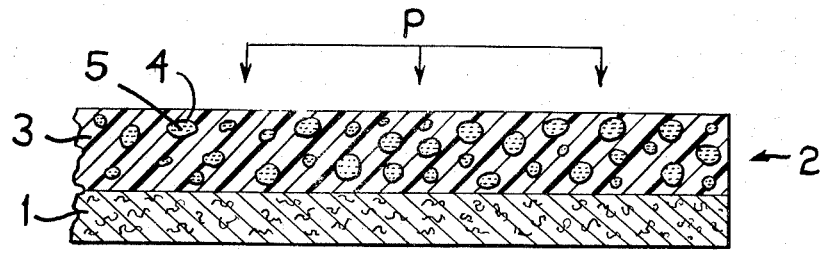
FIG. 1 is a greatly enlarged sectional view of a film coated upon a paper or other fibrous substrate and having therein a plurality of discrete closed cells containing a volatilizable liquid which is a non-solvent for the polymer matrix of the film.

The basic film contemplated by this invention is a generally continuous, non-opaque film comprising a polymer matrix containing a plurality of discrete closed cells and a material within the cells which is a non-solvent for the polymeric matrix, and preferably is a liquid which is volatilizable but will not permeate prematurely through the polymer matrix of the formed film.

The discrete closed cells in the polymer matrix are of a sufficient number and size such that when the cells are ruptured and non-solvent is released therefrom, the film will be opaque in the area of rupture. In this respect it is understood that cell size and shape will not be perfectly uniform throughout a particular film. Rather, it has been found, that sizes vary and shapes range from circular to oblong depending upon the polymer system, technique, and/or environmental conditions used. Acceptable opacity has generally been found to be obtainable regardless of the shape of the cells provided their approximate diameters range from about 0.01 micron to about 30 microns. Preferred films having excellent opacity are achieved when the cells are substantially spherical and their diameters are less than 0.5 micron.

The basic method contemplated by this invention for forming and opacifying the above described films generally comprises first forming a film of a polymeric material containing a plurality of discrete closed cells having entrapped therein a material which is a non-solvent for the polymeric materials, i.e., the polymer or polymers of the system, and then opacifying at least a portion of the film by rupturing at least some of the cells to release the entrapped non-solvent therefrom. The non-solvent material used may be either a solid or a liquid, but in all instances must be a material which is removable from the film by some technique once the closed cells are ruptured.

The formation of films containing a plurality of discrete closed cells having entrapped therein a material and preferably minute droplets of a non-solvent liquid may be accomplished by adapting any of the techniques hereinbefore described, which form closed cells and entrap the non-solvent material, so as to achieve opacity upon cell rupture. This generally requires that the polymer matrix chosen be capable of rupture, and that the non-solvent material be in an amount sufficient such that the size and number of empty cells formed upon rupture will render the film at least partially opaque. If the film is to be used as coating to form a reproducing sheet, the polymer matrix should be substantially impermeable to the liquid non-solvent.

One example of technique for forming films capable of achieving the objectives of this invention may be generally referred to as a solvent precipitation technique and is disclosed in applicant's copending application Ser. No. 4,175, filed Jan. 14, 1970, now abandoned, which is a continuation of Ser. No. 524,953, now abandoned. This technique, when adapted for use in this invention, includes first applying to a substrate a composition comprising a film forming gelable polymer, and a solvent mixture for said film forming material comprising at least two miscible liquids, at least one of said liquids being a non-solvent for said polymer and having a lower volatility than that of the other liquids in said mixture. At this point the polymer and solvent mixture form a single phase. Next the liquids of the solvent mixture which have higher volatilities than the non-solvent are removed as by evaporation to thereby form a film containing a plurality of discrete closed cells having entrapped therein minute droplets of the non-solvent. In a preferred form, the non-solvent is in an amount sufficient such that upon rupture and release of the non-solvent droplets from their cells, the film will have a Kubelka-Munk scattering coefficient greater than 0.5 reciprocal mil at 4400 angstroms and greater than 0.1 reciprocal mil at 5600 angstroms. When an optimum point is reached, it has generally been found that the entrapping cells are substantially spherical and have diameters less than 0.5 micron.

The film forming gelable polymers which may be used in this adapted solvent precipitation technique include thermoplastic and thermosetting synthetic as well as natural polymers. The only limitations on the film forming polymers are that: (a) they must be soluble in (i.e. miscible with) the particular solvent mixture used; (b) they must be capable of gelling (i.e. being transformed from the liquid phase to the solid phase) upon evaporation of a portion of the solvent system; and (c) they must be capable of retaining after solvent evaporation at least a portion of the entrapped non-solvent. Preferably, the polymers should also be capable for forming upon entrapment and matrix drying (i.e. removing the solvents etc. but not the entrapped non-solvent) a film which is substantially non-opaque. By "non-opaque" is meant substantially transparent or translucent when in a thin layer Examples of film forming, gelable polymeric materials, substantially all of which form transparent or translucent films at workable thicknesses (i.e. about 1–5 mils), are set forth in applicant's copending application Ser. No. 4,175, filed Jan. 14, 1970, now abandoned. Of the polymers disclosed in this copending application one preferred group of film forming materials which is found especially useful in the practice of this precipitation technique includes carboxylic acid amide interpolymers of the type disclosed in U.S. Pats. Nos. 2,870,117; 2,978,437; 3,037,963, and 3,118,853. The interpolymers of these patents are prepared by forming an interpolymer of an unsaturated carboxylic acid amide, such as acrylamide or methacrylamide, with at least one other polymerizable ethylenically unsaturated monomer, and then reacting the interpolymer with an aldehyde, such as formaldehyde, usually in the presence of an alcohol, such as butanol. The interpolymers so formed are thermosetting resins which have a high enough impermeability to various non-solvents so as to allow the films formed from them to be cured or cross linked without a substantial amount of the non-solvent permeating through the polymer matrix. Such impermeability insures that a film formed from these materials will be substantially non-opaque even after curing and prior to solvent release.

Another preferred class of polymers comprise interpolymers of hydroxyl-containing esters of unsaturated acids with at least one other copolymerizable monomer. Such polymers are described, for example, in U.S. Pats. Nos. 2,681,897; 3,375,227, and 3,382,294. They are ordinarily utilized in combination with one or more other coreactive materials, such as aminoplast resein, epoxy resins and/or alkyd resins. Various other combinations of these resins can also be used as can these types of resins alone.

Still other preferred polymers for use in this technique are the group of thermoplastic polymers which exhibit high impermeability to many commercially available polymer non-solvents. Such polymers enable a maximum amount of non-solvent to be retained for a maximum length of time after the film is formed and thus find especially good utility in the reproducing and typewriter paper art. Some examples of these polymers are polyvinyl chloride and polymethyl methacrylate.

As disclosed in Ser. No. 4,175, filed Jan. 14, 1970, now abandoned, various solvents and solvent mixtures may be used depending upon the polymer system chosen. A liquid which is a volatile solvent for one system may actually be a non-permeating non-solvent for another system. Classes of liquids which may be employed include ketones, esters, alcohols, aliphatic, aromatic and chlorinated hydrocarbons and the like. Specific examples illustrating some of these liquids will be hereinafter presented.

The actual formation of a film by this solvent precipitation technique is accomplished by first applying the polymer solution to a substrate, such as paper. This may be done by any process well known in the art such as by brushing, dipping, or spraying. After this application of mixture, liquids having higher volatilities than the non-solvent are removed as by evaporation. This removal may be accomplished by any of the well known techniques common to the art. Such techniques include ambient air drying, heated nitrogen gas or air drying, and, in the case of curing drying film formation, baking the film. It is understood, of course, that any use of temperatures higher than room temperatures to remove the solvent liquids will not be so high as to cause the non-solvent to evaporate as well. The film thus formed is characterized by a polymer matrix having therein a plurality of essentially closed cells wherein are located minute droplets of liquid non-solvent.

Another technique which has proved extremely useful for obtaining improved films is disclosed in applicant's copending applications Ser. No. 741,502, filed July 1, 1968 and Ser. No. 745,433, filed July 17, 1968. This method for producing films comprises applying to a substrate a mixture of a latex and a liquid which has a higher boiling point than water and which is a non-solvent to the polymeric material of the latex. After application of the mixture to the substrate, the water, which comprises the continuous phase of the latex is removed. During this removal, a sufficient amount of non-solvent is entrapped in the polymeric material before it becomes tack-free so that upon application of pressure on the film, a resulting film is produced which will have a Kubelka-Munk scattering coefficient as described above in the area wherein the pressure has been applied.

The amount of non-solvent entrapped in the polymeric material before it becomes tack-free can be controlled by several techniques. One technique is to control the flow characteristics of the polymeric material during water removal so as to accelerate the time at which the resulting film becomes tack-free. The flow characteristics of the polymeric material may be controlled by one of several techniques which will be described in greater detail hereinafter.

Another technique, which is a preferred embodiment of this invention, is to employ a very low volatile liquid as the non-solvent. When using a good film former, these non-solvents will have a mean boiling point of more than about 400° F. Instead of employing a very low volatile liquid as the non-solvent, it is possible to incorporate a large amount of liquid non-solvent in the latex composition so that there will still be sufficient non-solvent in the polymeric material when it becomes tack-free such that upon evaporation of the remaining non-solvent, the resulting film will have a Kubelka-Munk scattering coefficient as described above. However, it will be understood by those of skill in the art that often it is not economically feasible to employ excessive amounts of non-solvent in the composition. The amount of non-solvent added to the composition can be adequately decreased by selecting a liquid which has a higher boiling point range than otherwise provided for.

For purposes of this invention the non-solvent in this technique, as in the other techniques, is preferably chosen for its ability to remain in the film after film formation and more preferably after curing when thermosetting resins are used.

It will be understood, of course, the amount of control effected depends upon the type of polymeric material used and the degree of continuity desired in the resulting film. However, it may be stated that for the purposes of this invention which ultimately seeks to obtain opaque films, the amount of control is to an extent sufficient to form a film having entrapped therein minute or very small droplets of the non-solvent. The film at this point, i.e., having minute droplets of liquid entrapped therein, is not generally opaque but rather is usually transparent or translucent. In this form, the film may generally be considered an intermediate product. However, this intermediate product has utility in and of itself in that it is a commercial product which may be sold in this form for future removal either of the entire amount of the non-solvent to make an opaque film or only a partial amount of the non-solvent to make various film designs. In a preferred method, the operation forms a fully white and opaque film by removing the minute or very small droplets of non-solvent. In either case, the final or eventual removal of the non-solvent droplets result in the formation of tiny or minute voids in the film to obtain a non-porous, microcellular film.

The term "latex" as used herein is a term well known in the art and generally describes a two-phase system. The first phase is generally referred to as the continuous phase and is made up essentially of water and at times certain soluble additives to effect various results (e.g. emulsifying agents). A preferred additive is glycol, which improves the flow characteristics of the polymer. The second phase is a distinctly separate phase dispersed in the first phase and is generally referred to as the discontinuous phase since it comprises a plurality of particles of various well known polymeric materials. Although the size of the polymeric particles may be of any convenient size, within the meaning of the term, the particles must form a distinct second phase as opposed to solutions and quasi-solutions. It is therefore readily seen that this type of water dispersion adds much commercial flexibility to a film making system when compared with a system which requires the great bulk and non-flexibility of a solution or quasi-solution.

The specific latexes contemplated for controlled film forming use herein are those latexes which include as their discontinuous phase polymeric materials which are non-film formers, marginal film formers, and/or good film formers. Some examples of non-film formers at room temperature (20°–25° C.) include vinyl acetate homopolymers (e.g., "Elvacet 84–1100"), latex homopolymers of styrene, latex homopolymers of methyl methacrylate or latex copolymers of styrene and methyl methacrylate. Preferred marginal film formers at room temperature include a butadiene-styrene latex such as that known as "Lytron 5202" and certain copolymers of ethyl acrylate and methyl methacrylate. Examples of good film formers at room temperature include acrylate polymers such as "Rhoplex AC–34," vinyl acetate copolymers such as the copolymer of 75% vinyl acetate and 25% dibutyl maleate, and a vinyl acetate copolymer latex of 75% vinyl acetate and 25% ethyl hexyl acrylate.

Without suitable control techniques a non-film former in latex form mixed with a non-solvent does not form a film upon removal of the water nor coalesce enough to entrap sufficient amounts of non-solvent to enable the resulting non-film coating to become opaque upon the later removal of the non-solvent. Marginal film formers in latex form generally form some type of semi-continuous film having entrapped therein some small amount of non-solvent, but without a control technique the resulting continuity and opacity depends solely upon the particular polymeric material used. Good film formers in latex form flow very well and thereby form very continuous films. Since the flow characteristics in many good film formers are so high, in order for there to be adequate non-solvent entrapped in the film, the non-solvent should be of sufficiently low volatility such that film formation is essentially complete, i.e., the film is tack-free, prior to evaporation of the non-solvent.

With the control techniques as alluded to hereinabove, both opacity and film continuity can be varied and optimized over a wide range for any given latex system which will not decompose prior to reaching its flow point. These control techniques assume five basic forms as follows.

Firstly, the temperature of the applied mixture may be accurately controlled during water removal such that the system during flow or coalescence is held at a temperature a specified number of degrees from its glass transition temperature (Tg), or minimum film forming temperature. This first control technique is operative for all the latex systems contemplated herein whether they be non-film formers, marginal film formers, or good film formers. For example, if a non-film former latex system is used to achieve a substantially continuous film of optimum opacity, the system's glass transition temperature is first determined by conventional techniques. The latex-non-solvent mixture is then applied to a series of substrates and by simple trial-and-error experimentation using various temperatures above the glass transition temperature, optimization of opacity and continuity can be achieved. Similar procedures may be used for good film formers, which usually require a lowering of the temperature of the system, and marginal film formers, which merely require careful control of temperature about their glass transition temperature. Of course it is understood that in the above described temperature techniques which use temperatures higher than the boiling point of water, the non-solvent liquid should be less volatile than water at the highest temperature used to control the flow characteristics. This insures that the non-solvent will become entrapped during control rather than evaporate off along with the water.

The second technique contemplated for controlling the flow characteristics of a latex system generally comprises adding coalescers, plasticizers, and/or polymer thickeners to the system in order to increase flow. Although this technique basically applies to marginal film formers, it may also be used to achieve both continuous and semi-continuous films from latexes of the non-film forming type.

The coalescers, plasticizers, and thickeners contemplated for use herein are well known to the art. Some examples of coalescers useful in this invention are ethers, high boiling alcohols, esters and ketones. Some examples of plasticizers are dibutyl phthalate, butyl benzyl phthalate, tricresyl phosphate and polyethylene glycol. Some examples of thickeners are carboxy-methyl cellulose, hydroxy ethyl cellulose, maleic acid styrene copolymers, methyl methacrylate methacrylic acid copolymers and copolymers of maleic anhydride and methyl vinyl ether.

The third technique contemplated for controlling flow characteristics generally comprises adding to the latex system (i.e., either before or after the non-solvent is added) various flow-inhibiting agents which retard the tendency of the particles during water removal to form a film. This technique is generally applicable when good film former latexes are used to thereby prevent excessive flow and thereby insure the entrapment of non-solvent droplets. However, such a technique finds limited use with upper region marginal film formers when semi-continuous films are desired. Optimization of this technique, as in all of the techniques discussed herein, may be arrived at through routine experimentation. Some examples of the flow-inhibiting agents contemplated for use in this invention are such materials as silica powder, clay, pigments, and mixtures thereof.

The fourth basic control technique contemplated for use herein generally comprises adding either one or more non-film formers and/or marginal film formers to a good film forming latex system or adding one or more good film formers to a marginal film forming or non-film forming latex system to thereby control the flow of the resulting film forming composition. The additives which effect the desired control may be dry pigments or may themselves be latexes. For example, a non-film forming latex non-solvent mixture may have its flow characteristics enhanced by adding thereto a sufficient amount of a good film former to achieve optimum opacity and a desired film continuity. It is, of course, understood that this technique also contemplates the addition of marginal film formers as well as mixtures of marginal film formers and various other types of film formers to achieve the desired effect. Examples of applicable additives are those polymers exemplifying the various types of film formers used as the basic latexes of the applied mixture hereinbefore set forth.

A fifth technique contemplated for use herein to control the entrapment of the non-solvent in the film matrix of a good film former upon removal of the continuous phase generally comprises the use of a non-solvent having sufficiently low volatility such that the film is essentially tack-free prior to evaporation of the non-solvent. These non-solvents will generally have a mean boiling range of over about 400° F. Since these solvents are of such low volatility the good film former will undergo substantial film formation and become tack-free prior to the evaporation of a majority of the non-solvent.

The above discussed techniques exemplify basic methods useful for controlling the flow characteristics of a film during continuous phase removal. It can be seen, however, other control methods and variations and combinations of the techniques described also can be used. For example, the temperature technique can be used with the inhibiting technique to achieve further optimization for various systems which require extremely careful control. The other techniques may also be used in combination with one another or all the techniques may be used together if so desired or found necessary.

The above-described controls form an important part of the overall ability to achieve optimum opacity and film continuity. Another important factor in optimizing a desired result is the amount of liquid non-solvent added to the latex. For example, if too much non-solvent is added, the resulting film will be discontinuous. On the other hand, if too little non-solvent is added an insufficient number of voids will be formed and thus opacity of the film will not be optimized. The only adapting limitation on these control techniques when used in this invention is that they should control the flow characteristics of the polymer material sufficiently such that enough non-solvent is entrapped in discrete closed cells so that, upon rupture of the cells, release of the non-solvent will result in the film becoming opaque in the area of rupture.

As in the other techniques, the application of the polymeric material to a substrate in this technique may be done by any of the conventional methods such as by brushing, dipping, or spraying. Likewise, water removal processes applicable for use in this technique are well known as, for example ambient air drying, forced hot air drying, or in the case of curing a thermosetting resin, baking the film. In all instances the temperatures used must not exceed the point at which a substantial portion of the liquid non-solvent will evaporate from or through the film to render it opaque.

A film having optimum opacity, for practical purposes, may be described as a film having a Kubelka-Munk scattering coefficient greater than 0.5 reciprocal mil at 4400 angstroms and greater than 0.1 reciprocal mil at 5600 angstroms. At this optimum point, void diameters generally have been found to be less than 1.5 microns, although good opacity may be achieved with void diameters as high as 30 microns. Therefore, for the purposes of this invention, the amount of non-solvent mixed with the latex should not be so great as to effect a discontinuous film upon removal of the water from the system but at the same time must be great enough so that the resulting film will at least approach the described optimum opacity characteristics. Given the proper amount of liquid non-solvent, then, the various control techniques as above described will be co-related with this amount of non-solvent, in order to achieve the desired result.

To obtain films which have an optimum scattering coefficient as described above, it has been found that the compositions of this invention will generally have a weight ratio of non-solvent to polymer solids of from about 3:1 to about 1:20. It will be understood by those of skill in the art that for some systems other ratios will be applicable. For example, if a large amount of a continuous phase component is employed a larger amount of non-solvent will be required. On the other hand, if a large amount of a flow inhibiting agent is employed a lesser amount of non-solvent will be required to obtain a film having an optimum Kubelka-Munk scattering coefficient as described above.

The non-solvent liquids contemplated for use herein, as previously alluded to, are non-solvents for the polymeric materials of the latex generally having a higher boiling point than water. These non-solvent liquids may be either miscible or immiscible in the water phase of the latex and when added to the latex may be added alone or with various additives such as an emulsifying agent for improved results.

Some examples of these non-solvents are odorless mineral spirits, high flash aromatic naphtha, naphthenic mineral oil, neat's foot oil, pine oil and the like. The odorless aliphatic mineral spirits and high flash aromatic naphthas will generally have a mean boiling point range of from about 300° to about 600° F., preferably from about 400° to 550° F. when employing a good film former without the addition of flow inhibitors. Typical mixed aliphatic-aromatic compounds which may be employed as non-solvents are phenyl cyclohexane, triethyl benzene, phenylpropane and the like. Various other compounds may be employed as non-solvents such as dicyclohexyl amine, isoamyl bromide, trichloropropane, methyl benzyl ketone, allyl butyrate and the like.

The emulsifying agents which may be employed in accordance with the practice of the invention are conventional and well known. A typical example of a preferred emulsifying agent used in accordance with the practice of the invention is the proprietary compound, TX–305 which is a polyetherphenol adduct surfactant made by Rohm and Haas.

Various other materials known in the coatings industry may also be added to the compositions of this invention to achieve many particular desired results. Among some of the materials which may be added to the compositions of this invention are fungicides, mildewcides, surfactants, flow modifiers, thickeners, free flow stabilizers, anti-skin agents, anti-flocculants, pH stabilizers and various other additives known by those of skill in the art.

When some of the foregoing additives are added to the compositions, care must be taken to insure that sufficient non-solvent will be entrapped in the polymeric material prior to the time at which the material becomes tack-free in order to provide sufficient void formation and to obtain a film having an optimum Kubelka-Munk scattering coefficient upon the evaporation of the non-solvent. Therefore, when employing the higher boiling continuous phase components such as glycol it is generally necessary to either employ a larger amount of liquid non-solvent than otherwise previously employed or employ a liquid non-solvent with a higher mean boiling point.

Many other techniques may be adapted to form the preliminary films of this invention. For example, the various water-in-oil, oil-in-water techniques heretofore discussed which entrap liquid non-solvents within discrete closed cells may be adapted to this invention. These techniques are useable in this invention by providing the same adapting principles used in the above discussed techniques of the incorporated copending applications.

That is to say, prior art techniques which form entrapped liquid non-solvent films may be adapted for use in this invention by choosing liquid non-solvents which are generally non-permeating, or not capable of evaporating from the closed cells of the polymer matrix. The adaption also includes providing enough non-solvent so that a sufficient number of cells having a proper diameter will be formed in order that opacity may be maximized. In any event, the adaptation will always eliminate the step of evaporating the liquid non-solvent from the film and will include the step of releasing the non-solvent by rupturing the cells. Preferably, of course, the prior art techniques when adapted will use polymeric materials which form substantially non-opaque films before cell rupture. The choice of non-solvents and polymeric materials etc., once given the considerations discussed above and the examples to follow, will become readily apparent to one skilled in the art.

The preliminary films of this invention containing discrete closed cells and having entrapped therein minute droplets of a liquid non-solvent need not be transparent or translucent since partially opaque films have utility. Such utility arises when opacification by release of non-solvent renders that portion of the film more opaque (i.e. having a more optimum or higher Kubelka-Munk scattering coefficient) than the original opacity of the film and thus provides a contrast between the two areas. Any visible contrast provides a means by which designs may be formed in the films. Preferably, however, the films formed are transparent or translucent at the thicknesses used.

When the preliminary films formed are transparent or translucent, i.e., non-opaque, such films find particularly good utility as coatings on paper substrates so as to form reproducing sheets or manifold sets. Opacification of these films is generally a bright or brilliant white opacification. Thus, a reproducing paper sheet in its simplest form as made by this invention comprises a paper substrate of a color or shade other than white is provided with a coating of the preliminary films of this invention hereinabove discussed. By "preliminary film" is meant a film of this invention containing a plurality of discrete closed cells having entrapped therein minute droplets of a liquid non-solvent.

Figure 3:
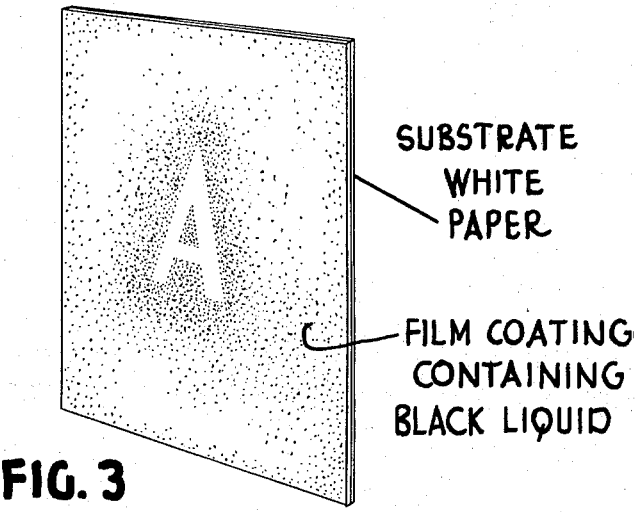
FIG. 3 illustrates an embodiment of this invention wherein a design is formed in a film which contains a colored or contrasting removable liquid.

Referring to the drawings, FIG. 1 illustrates one form of coated film. A paper substrate 1 is provided with a coating 2 of a transparent film 3 containing cells 4 having entrapped therein minute droplets of a non-permeating liquid non-solvent 5. If pressure P is applied in the direction of the arrows with sufficient force to rupture or break the cells thereunder, that portion of the film will become white and opaque when the non-solvent is removed, as by evaporation. In this respect it should be reiterated that the non-solvent used is preferably a volatilizable liquid that will evaporate upon rupturing of the film cells. Such a film may be formed by using one of the above-named polymers which is impermeable to the non-solvent, thus allowing a more highly volatile non-solvent to be used. If the liquid non-solvent is a colorless liquid, the paper substrate must be of a color other than white in order for white opacification to form a contrasting design with the background material. If, on the other hand, the liquid non-solvent is colored or has a shade other than white, a design may be formed as illustrated in FIG. 3 on a substrate regardless of the substrate's color since the non-ruptured portion of the film exhibits a color or shade other than white. As shown in FIG. 3, the application of pressure will form a contrasting white opaque film in the area of pressure which may be of any design depending upon the design of the pressure applicator.

The types of colored liquids which may be used are well known in the art. For example, water colored with vegetable dye, or various non-solvents having various inorganic coloring agents dissolved therein may be used. Preferably the coloring agent will be released when the non-solvent is released so that no residue of color is left behind to distort or degrade the contrasting white opacity. However, the invention is not so limited since various well known dyes and pigments may also be included in the non-solvent. In these instances the dye or pigment will in certain instances be precipitated or left in the open ruptured cells when the non-solvent is released. However, since the cells are now open, the precipitated dyes and pigments form a type of "latent" image which may be developed by washing the film lightly with a solvent for the dyes and pigments. The solvents used are ones which will not permeate the closed cells of the film but will remove the dyes and pigments upon draining. A typical example would be a washing with water when water soluble dye has been used. In this respect, it should be realized that the dyes and/or pigments in the non-solvent liquid may be removed without a washing step by applying a vacuum to pull out the non-solvent liquid before it evaporates. Furthermore, if a "latent" image is desired, the dyes and pigments may be first precipitated and then redissolved followed by the application of a vacuum.

It should be remembered when viewing FIG. 1 that this is a greatly enlarged sectional view of a film on a substrate. In practice the cells as heretofore described are very numerous and have exceedingly small diameters. For this reason, high resolution of design lines may be realized on these films. This resolution enables these films to be used in many ways, one of which discussed hereinabove, is as a coating for a sheet of typewriter paper. By optimizing opacity, flexibility, and film thickness, a coated paper sheet illustrated in FIG. 1 may be used as an original sheet of typewriter paper, thus eliminating the need for typewriter ribbons.

Figure 2:
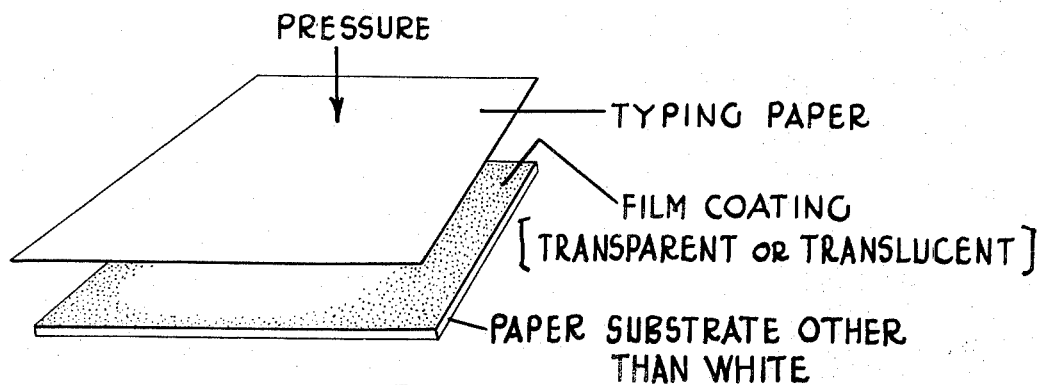
FIG. 2 illustrates one type of a two-sheet manifold set contemplated by this invention.

As illustrated in FIG. 2, the coated sheets of FIGS. 1 and 3 may be used as a copy sheet rather than as the original. The application of pressure as by a typewriter key to a standard original sheet requiring a ribbon provides the pressure to rupture the cells of the coated copy sheet and thus forms a copied image thereof.

It should be realized that the above two techniques of using the coating as an original or a copy may be continued in a number of ways. For example, a manifold set may be formed of a standard original sheet and a copy sheet of this invention. On the other hand, the set may comprise two sheets, one an original and one a copy sheet, both coated in accordance with this invention. Also, the sheet of this invention may be used in a manifold set as the original while a standard carbon paper plus a copy sheet is used as the other parts of the set.

The step of opacification by rupturing the cells and releasing the non-solvent as contemplated by this invention may assume many forms and be of many types. For example, opacification may be achieved by rupturing the cells with a type of "branding iron" wherein a formed design in ridged metal is at one end of a rod, while a hammer or other device may be applied to the other end thereof. The pressure applicator may also have therein a vacuum attachment adapted so as to suck liquid non-solvent through small holes in the ridged metal of the "branding iron." Such an arrangement would preferably be used in situations where colored liquid or non-volatilizable liquid comprised the entrapped liquid non-solvent. The vacuum may also be used in systems where the entrapped liquid non-solvent is volatilizable at room temperatures and noxious odor of the liquid upon release is desirably eliminated.

The release non-solvent can also be removed by other means, such as by absorption onto a superimposed layer, by heating, etc.

In other embodiments contemplated by this invention, opacification by cell rupture may be achieved by using printing or design presses, by seals such as official seals, name stamps, trademark stamps, or in some instances by bending or rubbing the film. The rupturing, as already discussed above, may also be accomplished by a typewriter key when the film is coated upon appropriate typewriter paper. In this respect it is also evident that instead of a typewriter key, a simple pen or pencil may be used with equally beneficial results. When using a pen or pencil, the coated reproducing paper may be used as a copy sheet, but when using the paper as an original, a blunted point without writing pigment is all that is necessary to achieve clear writing on the paper.

In another embodiment of the invention the films can be used for photo copy devices where hot light sources are employed. In such an embodiment, the polymeric material is chosen so that the resulting resin will have a softening point of about 150° F. A film is drawn from the coating composition containing the non-solvent and air dried at room temperature (about 72° F.) to entrap the non-solvent. The air dried film is placed upon a paper with a black image or letters on it and the film and paper subjected to heat or infra-red light. The heat or infra-red light cause the film to flow in the areas where the black images or letters are located and these areas will never become opaque. The film is thereafter subjected to pressure, such as for example, crushed between two rollers to opacify the film except in the areas where the film has flowed from the heat treatment. The resulting films are useful when used in conjunction with the known opaque and transparent projectors.

Many other features and adaptations of this invention become apparent once given the above disclosure. For example, it is apparent that the non-solvent may actually be a mixture of two or more non-solvents. It is also apparent that the manifold set which comprises one form of this invention may contain more than two sheets and that the illustration of only two sheets herein is merely for clarity and convenience.

Although utility of these films has been specifically illustrated with respect to paper coatings it is apparent that they may also be utilized in automotive finishes, appliance finishes and in similar protective and decorative coatings when the film is totally or only partially opaque. Such films may have thicknesses of 10 mils or higher. Many of the coatings of this invention, particularly the highly cross-linked films, are extremely tough and abrasion resistant. Many films of this invention when opacified reflect light of wave lengths below 3800 angstroms which makes them useful as ultraviolet light reflectors. Further, many of the films of this invention when rendered opaque are of such whiteness as to be of use as white reflectance standards.

The examples which follow illustrate the best modes contemplated for carrying out this invention. The true scope of the invention is set forth above and is not limited by these examples.

Example 1

A 200 gram mixture of methyl methacrylate polymer and 50–50% by weight toluene and butanol solution having a total solids content of 40% is made. To this mixture is added with vigorous stirring 100 grams of acetone and 65 grams of mineral spirits. The resulting mixture is a clear, slightly yellow solution. This solution is then formed into a film of approximately 3 mils thickness on a metal substrate by a standard .029 wire wound draw bar. The film is allowed to dry at room temperature. A crystal clear substantially continuous film containing a multitude of tiny or minute cells having entrapped therein droplets of the mineral spirits results. The combination of impermeable methyl methacrylate and non-permeating mineral spirits is so highly effective that the film, after one month of aging at room temperature or baking at 250° F. for 30 minutes, still retains appreciable quantities of mineral spirits. The clear film is then subjected to pressure by bending the thin metal substrate almost in half. At the point of extreme bend the clear film immediately gives up the mineral spirits by evaporation and becomes an opaque white.

Example 2

To 100 gm. of a vinyl acetate copolymer latex made of 75% vinyl acetate and 25% dibutyl maleate (mole percents) dispersed in water is added with vigorous mixing 40 gm. of liquid mineral spirits. The mixture is then applied to a piece of standard typing paper such as green 8½ x 11 bond paper by roll-coating. The thickness of the resulting film when allowed to air dry is 1.5 mils and contains many micro-droplets of mineral spirits therein. The sheet of paper when used in a manifold set either an original without a typewriter ribbon or as a copy proves to be a very useful reproducing paper since upon the application of pressure the mineral spirits are readily released. In this respect it is found helpful when using the coated sheet as a copy, to place a sheet of paper between the original and copy so as to absorb any spirits which might tend to be absorbed by the original.

Example 3

The same procedure is followed as in Example 2 except that octane is used instead of mineral spirits. Generally similar results are achieved.

Example 4

This example illustrates the use of a latex using the marginal film forming flow control technique as described above.

A surfactant mixture is formulated by mixing at a temperature of 100° F. 3120 gms. of deionized water, 176 gms. hydroxyethylcellulose (Natrosol J), 205 gms. of nonyl phenol ethylene oxide adduct nonionic surfactant (TX–100), 294 gms. of nonyl phenol ethylene oxide adduct nonionic surfactant (Igepal CO–887) and 212 gms. of sodium lauryl ether sulfate anionic surfactant (Sipon E.S.). This mixture is then cooled and filtered.

100 gms. of this cooled and filtered surfactant mixture are then added to 2000 gms. of good film forming latex comprised of 50% by weight copolymer of 75% vinyl acetate and 25% dibutyl maleate and 50% by weight $H_2O$. To this mixture is then added a liquid non-solvent and various monomers which copolymerize to form a non-film forming polymer which retards the flow of the good film former during water removal therefrom and thus entraps the non-solvent therein. This is accomplished as follows: To the above good film forming latex-surfactant mixture are added with agitation 1100 gms. of odorless mineral spirits (non-solvent), 60 gms. styrene, 20 gms. lauryl methacrylate, 10 gms. acrylonitrile, 10 gms. ethylene glycol dimethacrylate and 0.5 gm. benzoyl peroxide. The resulting mixture is then heated to 170° F. and held for 2 hours. To this heated mixture are then added over a four hour period, 3 gms. of potassium persulfate (a secondary polymerization catalyst) and 160 gms. of water. During this interval of time the above monomers copolymerize to form a non-film former. The resulting total mixture is then cooled and drawn into a film using a 6 mil draw bar. The film which forms upon water removal (e.g. as by evaporation) is non-white and has entrapped therein minute droplets of odorless mineral spirits; thus illustrating that the flow of the good film former was controlled to a sufficient degree. Upon spreading the film very thin or by applying pressure thereto, the film turns a brilliant white in the area of spread or pressure.

Example 5

172 gms. of a copolymer comprised of (by weight) 10% acrylamide, 2.5% methacrylic acid, 5% hydroxyethyl methacrylate, 20% acrylonitrile, 61.5% styrene, and 1% butylene glycol dimethylacrylate are mixed with 140 gms. acetone, 85 gms. of mineral spirits and 2 gms. of 85% phosphoric acid. This mixture is then drawn into a film using a .050 wire wound bar on an Alodine 1200 aluminum plate. The film is air dried for 5 minutes and then baked at 350° F. for 30 minutes. The resulting film is clear and has dispersed therein a plurality of minute droplets of odorless mineral spirits. Upon bending or application of pressure to the film sufficient to rupture non-solvent containing cells therein the film turns a brilliant white. In the areas of cell rupture the film has a Kubelka-Munk scattering coefficient greater than 0.5 reciprocal mil at 4400 angstroms and greater than 0.1 reciprocal mil at 5600 angstroms.

Example 6

200 gms. of a copolymer comprised of 91.25% methyl methacrylate, 2.00% acrylamide, 4.25% hydroxyethylmethacrylate, and 2.50% methacrylic acid reacted with ethylenimine are dissolved in 100 gms. of acetone to which 65 gms. of mineral spirits are added. A film formed and dried of solvent retains odorless mineral spirits in minute droplets and is substantially clear until bent or pressure is applied thereto sufficient to rupture the non-solvent containing cells therein whereupon the film turns white.

In another embodiment, a similar mixture is formed as above except that 50 gms. of mineral spirits are used. Substantially the same type film results.

In a further embodiment, a similar mixture as the first above mixture is formed except that 50 gms. of lactol spirits naphtha are used instead of mineral spirits. Substantially the same unique type of film results.

Example 7

20 gms. of the copolymer of Example 6 are dissolved in 10 gms. acetone to which are added 6 gms. cedar oil. A film from this mixture is drawn by conventional technique and dried of acetone. The resulting film is substantially clear and although the cedar oil does permeate slightly through the polymer matrix, it remains in droplet form in the film for a sufficient length of time to provide for pressure release of the cedar oil by rupturing the film at some later date. Such a film may be used as a coating on personal colored stationery wherein a message is written by means of a blunt instrument and the cedar oil absorbed by a layer of absorbent paper.

In another embodiment, the same mixture as above is formed except 12 gms. of cedar oil are used. A similar film results.

Example 8

10.0 gms. of dispersion grade vinyl chloride are mixed with 10.0 gms. Isopar M (high boiling aliphatic liquid, B.P. 405–495° F.), 15.0 gms. high flash aromatic naphtha, 25.0 gms. cyclohexanone, and 1.0 gm. diisodecyl phthalate. The mixture is thoroughly stirred and heated to 150° F. until it becomes a clear jelly, i.e., the vinyl chloride is dissolved. This jelly is then drawn into a film using a .050 wire draw bar and baked at 250° F. to remove solvent. Even after baking the film is only a milky white which upon stretching or application of pressure turns a bright white which contrasts with the unstretched or non-pressure treated portion of the milky white film.

When the above film forming mixture is thinned with an additional 60 gms. of cyclohexanone the resulting film formed by the above procedure is a high gloss tough relatively clear film which whitens upon application of pressure. Such a film may be coated on the outside of an appliance such as a home dishwasher and slightly abraded to release the entrapped non-solvent therefrom. Not only is the coating a bright white but it forms a tough protective coating as well.

Example 9

10 gms. of the vinyl chloride of Example 8 are mixed thoroughly with 15 gms. Isopar M, 14 gms. high flash aromatic naphtha, 1.0 gm. diisodecyl phthalate and 60 gms. cyclohexanone. The mixture is heated to 200° F. to dissolve the vinyl chloride, cooled, and then drawn into a film with a 6 mil Bird applicator and baked for 2 minutes at 250° F. to remove solvent. The resulting film is flexible and clear but becomes very white (i.e., an optimum Kubelka-Munk coefficient as set forth above) when stretched. Such a film may be manufactured in sheets by running the clear film through synchronized rolls turning at different speeds which stretch the film thereby rendering it a bright white as it is being produced. Such white sheets of film are advantageously used in packaging since they are opaque and light reflective and thus serve to protect the contents of a package from external light.

In view of the above disclosure many other embodiments and modifications of this invention will become apparent to those skilled in the art. Such embodiments and modifications are therefore within the scope of this invention, which scope is defined by the following claims.

I claim:
1. A method of producing a continuous film having a substantially transparent or translucent area and an opaque area comprising:
   (a) forming a continuous substantially transparent or translucent film of a polymeric material containing a plurality of discrete closed cells, said film forming a matrix for said cells, said discrete closed cells having entrapped therein a volatilizable liquid non-solvent for said polymeric material, said polymeric material being substantially impermeable to said non-solvent, and

(b) rupturing the film matrix containing said discrete cells and the walls of said cells in an area of said film to release said volatilizable non-solvent from the discrete cells in said area until said cells are substantially free of said non-solvent and form voids, said ruptured area containing non-solvent-free discrete cells in a number and of a size sufficient to provide said ruptured area a Kubelka-Munk scattering coefficient greater than 0.5 reciprocal mil at 4400 angstroms and greater than 0.1 reciprocal mil at 5600 angstroms and to render said ruptured area of said film opaque.

2. A method according to claim 1 wherein said polymeric material is a thermosetting resin and said resin is cured after forming the film but prior to subjecting the film to said opacifying treatment.

3. A method according to claim 2 wherein said curing comprises baking said resin at a sufficient temperature and for a sufficient period of time to effect at least partial cross-linking of the resin.

4. A method according to claim 1 wherein the step of forming the film comprises:
   (a) applying to a substrate a composition comprising a film forming material containing at least one film forming, gelable polymer and a solvent mixture for said film forming material comprising at least two miscible liquids, at least one of said liquids being a non-solvent for said polymer and having a lower volatility than that of the other liquids in said mixture, said solvent mixture and said polymer forming a single phase; and
   (b) removing the liquids of the solvent mixture which have higher volatilities than said non-solvent to thereby form a film containing said plurality of discrete closed cells having entrapped therein minute droplets of the volatilizable non-solvent.

5. A method according to claim 1 wherein the step of forming said film comprises applying to a substrate a mixture comprising a latex and a material which is less volatile than water and which is a non-solvent to the polymeric material of the latex, removing water from the applied mixture while at the same time controlling the flow characteristics of the dispersed polymeric substances to an extent sufficient to form a film containing discrete closed cells having entrapped therein minute droplets of the volatilizable non-solvent.

6. A method according to claim 1 wherein said film is formed upon a paper substrate and said rupturing of said cells comprises applying pressure to a selected portion of said film to thereby form a design of the areas of applied pressure.

References Cited

UNITED STATES PATENTS

| | | | |
|---|---|---|---|
| 2,854,350 | 9/1958 | Phillpotts | 117—36.7 |
| 2,988,461 | 6/1961 | Eichel | 117—36.1 |
| 2,961,334 | 11/1960 | Clancy et al. | 117—36.7 |
| 2,739,909 | 3/1956 | Rosenthal | 117—36.7 |
| 3,298,895 | 1/1967 | Plambeck | 117—36.7 |
| 3,111,407 | 11/1963 | Lindquist et al. | 117—36.7 |

MURRAY KATZ, Primary Examiner

U.S. Cl. X.R.

117—155 UA

UNITED STATES PATENT OFFICE
CERTIFICATE OF CORRECTION

Patent No. 3,684,551          Dated August 15, 1972

Inventor(s) Jerome A. Seiner

It is certified that error appears in the above-identified patent and that said Letters Patent are hereby corrected as shown below:

In Column 1, after line 5, it should state --assignor to PPG Industries, Inc., Pittsburgh, Pa.-- as specifically set forth in the Assignment filed in the Patent Office on April 15, 1970 (Reel 2604, Frame 968).

Signed and sealed this 13th day of March 1973.

(SEAL)
Attest:

EDWARD M. FLETCHER, JR.
Attesting Officer

ROBERT GOTTSCHALK
Commissioner of Patents